(12) United States Patent
French

(10) Patent No.: US 6,393,713 B1
(45) Date of Patent: May 28, 2002

(54) GAGE FOR DETERMINING THE TRUE DEAD CENTER OF A WORKPIECE ON A LATHE OR MILLING MACHINE FROM EACH TOOL POCKET IN THE MACHINE TOOL TURRET OR CROSS SLIDE

(76) Inventor: Garland French, 2785 Tinkers La., Twinsburg, OH (US) 44087

( * ) Notice: Subject to any disclaimer, the term of this patent is extended or adjusted under 35 U.S.C. 154(b) by 14 days.

(21) Appl. No.: 09/642,456

(22) Filed: Aug. 18, 2000

Related U.S. Application Data

(60) Provisional application No. 60/150,032, filed on Aug. 20, 1999.

(51) Int. Cl.$^7$ .............................. G01B 5/24; B23B 15/00
(52) U.S. Cl. ........................................... 33/644; 33/520
(58) Field of Search .......................... 33/644, 504, 520, 33/533, 613, 626, 628, 638, 645

(56) References Cited

U.S. PATENT DOCUMENTS

| 4,118,871 A | 10/1978 | Kirkham |
| 4,190,889 A | 2/1980 | Etoh et al. |
| 4,382,215 A | 5/1983 | Bogren |
| 4,583,159 A | 4/1986 | Kanemoto et al. |
| 4,652,188 A | * 3/1987 | Augsburger ................. 33/644 |
| 4,682,420 A | * 7/1987 | Teets ........................... 33/520 |
| 4,778,313 A | 10/1988 | Lehmukuhl |
| 4,784,539 A | 11/1988 | Lehmukuhl |
| 4,790,545 A | * 12/1988 | Dzewaltowski et al. ...... 33/644 |
| 5,327,350 A | 7/1994 | Endo |
| 5,815,400 A | 9/1998 | Hirai et al. |

\* cited by examiner

Primary Examiner—Christopher W. Fulton
(74) Attorney, Agent, or Firm—John D. Gugliotta

(57) ABSTRACT

This invention is a gage for aiding a lathe or milling machine operator in determining whether the centerline of the lathe tool is in alignment with the workpiece. The gage is inserted in the lathe tool holder and pressed against a test bar installed in the lathe. If any gap exists between the test bar and one of the sloping surfaces on the front face of the gage, the gage and test bar centerlines are not in alignment. The gap is equal to the variation between the centerlines because of the geometric relationship established between the angle between the sloping front surfaces and the test bar. This gap is measured with a conventional automotive type feeler gage and the lathe tool is adjusted vertically by this amount using pre-cut shims supplied with the gage.

10 Claims, 5 Drawing Sheets

GAGE FOR DETERMINING THE TRUE DEAD CENTER OF A WORKPIECE ON A LATHE OR MILLING MACHINE FROM EACH TOOL POCKET IN THE MACHINE TOOL TURRET OR CROSS SLIDE

RELATED APPLICATIONS

The present invention is a Continuation in Part of U.S. Provisional Patent 60/150,032, filed on Aug. 20, 1999. There are no other copending applications, nor any previously filed applications anywhere in the world.

BACKGROUND OF THE INVENTION

1. Field of the Invention

The present invention relates generally to metal working machinery and, more particularly, to a gage and method for determining the true dead center of a workpiece and spindle center line on a lathe or milling machine.

2. Description of the Related Art

Human beings have constantly sought better ways to work metal into objects ever since man discovered that certain rocks when heated oozed a substance that when cooled became very hard and was capable of being of formed. Liquid metal was poured into molds of desired shape and then allowed to cool. The metal object was then further formed by grinding the edges to form a cutting surface or the object was bent to a desired shape. In this fashion, spears, knives, tools and utensils were fashioned. Metal working through the iron age, copper age, and bronze age remained pretty much the same. This continued through the late 1800's when the local blacksmith who forged and repaired metal items was one of the most important persons in the community.

The industrial revolution brought about dramatic changes in the metal working industry with the introduction of the blast furnace where large amounts of metal, typically iron and steel, could be extracted from ore. With large amounts of steel and iron now available virtually anything could now be manufactured from metal. This also required that the methods by which metal was formed into goods had to be improved in terms of not only speed but quality as well. Machinery powered by the electric motor were developed that could cut pieces of steel stock into desirable shapes. Machines were also developed that could selectively cut portions of a piece of metal stock by rotating the stock and pressing a special tool against the stock. The tool had a sharp edge which would cut a small portion of metal off the surface of the metal stock. The tool could then be pushed further into the stock or moved along the length of the stock. In this fashion bars of steel or other metal could be shaped into various pieces for making parts for all types of equipment and goods. This was the beginning of the metal working lathe as it is known today. Other machines were also developed which could selectively cut a piece of metal stock. The milling machine can cut a desired shape into a piece of metal stock by moving the stock into a rotating tool which has a sharpened edge. A series of adjustable hand wheels allows the machine operator to controllably guide the workpiece into the rotating tool. For decades the milling machine and lathe were the mainstay of the metal working industry which was the foundation of industry worldwide.

With the invention of computers, computer logic was added to guide the sequence in which the tool engaged the workpiece in both lathes and milling machines. In fact, machines were developed which performed both the function of a milling machine and lathe by utilizing a retractable turret which could rotate the appropriate tool to the workpiece upon the appropriate computer command. These machines are known as Computer Numerically Controlled (CNC) machines. In this fashion, a rotating milling machine tool could engage a workpiece followed by any one from a number of other cutting tools arranged radially on the rotating turret, each presumably positioned on the workpiece centerline. It is common to have several different tools for forming the workpiece in the lathe configuration.

In either case, whether it be an old variety lathe employing a single metal working tool or a CNC machine having numerous metal working tools, it is very important the tool be properly positioned relative to the workpiece. An incorrectly positioned tool can improperly cut a workpiece, "scuffing" the surface, causing tool life robbing chatter, or total catastrophic failure. The most desirable position for the tool is to have the tool's cutting point directly in the same plane or slightly ahead of the plane of the workpiece's centerline. A tool slightly ahead of the plane of the workpiece's centerline will experience a compression as the workpiece rotates into the tool. A tool slightly behind the plane of a workpiece centerline will experience a shearing force which is very destructive to ultra-hard metal cutting edges. It is well known in the field of material science that a material can withstand much larger compressive forces than shear forces. Therefore, it is imperative to ensure the proper alignment of the tool with the plane of the workpiece's centerline. The present invention fulfills this need by providing a device and method to determine the exact position of a tool holder pocket relative to the machine tool spindle and workpiece centerline. The "Dead Center" device determines how much to adjust and align the tool properly.

In the related art, there exists many patents for lathes and milling machines employing CNC technology to direct and control tool engagement with the workpiece. Many of these patents employ logic to ensure the placement of the tool in the correct position on the workpiece. However, these devices are quite technically complex and are integrally designed into the machine. They require elaborate sensors, servos, and controllers in addition to the software necessary to control these devices. These type of devices are of no use to existing conventional lathes or milling machines. Nor are they of any use to existing CNC machines that do not have an integral pre-existing tool alignment system. The art is completely devoid of an inexpensive aftermarket device for determining the true centerline of a workpiece on lathes and milling machines which do not have built in centering capabilities. A need has therefore been felt for an improved but less complex mechanism and method for determining the true centerline of a workpiece on lathes and milling machines. The present invention fulfills this need.

A search of the prior art did not disclose any patents that read directly on the claims of the instant invention; however, the following references were considered related:

| U.S. Pat. No. | Inventor | Issue Date |
|---|---|---|
| 4,784,539 | Lehmukuhl | Nov. 15, 1988 |
| 4,778,313 | Lehmukuhl | Oct. 18, 1988 |
| 4,382,215 | Barlow | May 3, 1983 |
| 5,815,400 | Hirai et al. | Sep. 29, 1998 |
| 5,327,350 | Endo | Jul. 5, 1994 |

-continued

| U.S. Pat. No. | Inventor | Issue Date |
| --- | --- | --- |
| 4,583,159 | Kanemoto et al. | Apr. 15, 1986 |
| 4,190,889 | Etoh et al. | Feb. 26, 1980 |
| 4,118,871 | Kirkham | Oct. 10, 1978 |

SUMMARY OF THE INVENTION

It is therefore an object of the present invention to provide an aftermarket gage and method for determining the true centerline of a workpiece on a conventional CNC lathe or milling machine.

It is another object of the present invention to provide a gage and method to measure the distance that a machine cutting tool or tool holder pocket is offset from the true centerline of a workpiece on a conventional or CNC lathe or milling machine.

It is yet another object of the present invention to provide a simple and inexpensive gage and method to measure the distance that a machine cutting tool or tool holder pocket is offset from the true centerline of a workpiece on a conventional or CNC lathe or milling machine.

It is still yet another object of the present invention to use a set of conventional feeler gauges to measure the gap between the bottom edge of the gage and the workpiece to determine the distance that a machine cutting tool or tool holder pocket is offset from the true centerline of a workpiece on a conventional or CNC lathe or milling machine.

It is yet still another object of the present invention to provide a generous assortment of metal shims available as industry standard thicknesses to match various sizes on a conventional feeler gage.

It is another object of the present invention to use a metal shim with the same thickness as the gap between the bottom of the gage and the workpiece as measured by the feeler gage to offset the tool in the tool holder so that it is aligned perfectly with the centerline of the workpiece.

It is yet another object of the present invention to use magnets on the side of the gage to temporarily hold the gage in the tool holder pocket while the gap between the bottom of the gage and the workpiece is measured with the feeler gage.

Briefly described according to one embodiment of the present invention, a gage and method for determining the true centerline of a workpiece or tool holder pocket on a conventional or CNC lathe or milling machine is provided consisting of a one piece gage cut from a suitable material such as high speed steel, tool steel, or stainless steel. The gage is essentially a flat metal bar with an arm on one end with a width corresponding to the dimensions of a tool holder on a conventional or CNC lathe or milling machine. The other end is Y-shaped having an upperwardly protruding arm with a upwardly sloping front edge located on the upper edge of the bar and a downwardly sloping front edge. Key to the functionality of the gage is the angle between the upperwardly sloping front edge on the upwardly protruding arm and the downwardly sloping front edge of the bar. By placing the upperwardly sloping front edge of the uppwardly protruding arm firmly against a workpiece mounted in a conventional or CNC lathe or milling machine one can determine the variance between the machine tool holder pocket and the machine tool spindle. The gap present between the downwardly sloping front edge of the gage and the workpiece is the exact measurement of that variance, either plus or minus. Because of the geometry of the angles between the downwardly sloping front edge of the gage, the upwardly sloping edge of the upwardly protruding arm, and the workpiece, this gap is exactly equal to the distance the two centerlines or planes of reference are out of alignment. This gap can be measured by a conventional feeler gage. The tool holder pocket or tool holder, can be adjusted that distance to match the two planes of reference. Magnets fixed on the sides of the gage temporarily hold it while the variance is measured.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
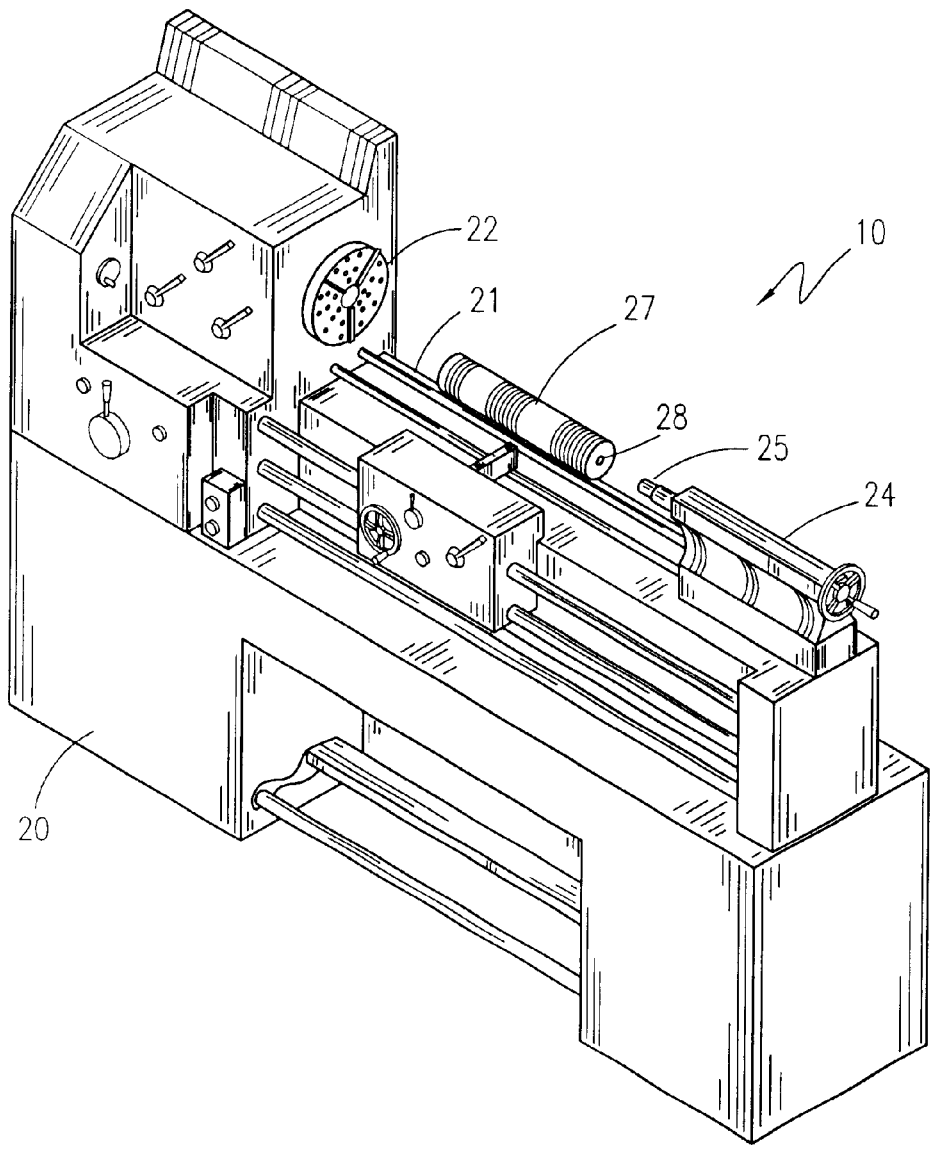
FIG. 1 is a front perspective view of a conventional metal working lathe, according to the preferred embodiment of the present invention.

Referring now to FIG. 1, a gage and method for determining the true centerline of a workpiece or tool holder pocket on a conventional lathe 10 (hereinafter referred to as lathe 10) is shown comprising a base 20, a bed 21, a chuck 22, a tail stock center 24, and an adjustable tool carriage 26. Typically, a cylindrically shaped piece of metal stock 27 is mounted on lathe 10 by inserting one end into chuck 22 and secured therein by a plurality of expanding and retracting radial arms on chuck 22. A small pilot hole 28 is drilled into a center of an opposite end of metal stock 27 where a pointed end 25 of tail stock center 24 is inserted therein. When lathe 10 is powered up, the metal stock 27 will rotate at high speed to facilitate the cutting and shaping of the workpiece. Most lathes have a variable speed switch to allow the operator to select a speed which is optimum for cutting performance. Located on the bed 21 of the lathe 10 is an adjustable tool carriage 26 which provides a base for a tool holder 30. The tool holder 30 has a tool holder pocket 32 formed therein for insertably receiving and securing a cutting or shaping tool, such as a gage 40 therein. The gage 40 is of a linearly elongated configuration with one end removably inserted and secured within the tool holder pocket 32 of the tool holder 30, opposite a branched, angular end with an upwardly sloping surface 44 opposite a downwardly sloping surface 45 for cutting or shaping metal stock 27. Once the machine is rotating, the upwardly and downwardly sloping surfaces 44, 45 of the branched end of the gage 40 can be controllably pressed against the external circumferential surface of the metal stock 27 by vertical adjustment of the adjustable tool carriage 26 via rotation of a handwheel of the adjustable tool carriage 26. Another handwheel is available to move the tool carriage along the elongated longitudinal axis of the bed 21 of the lathe 10. It is envisioned that the tool carriage 26 can also be controllably adjusted by automated means such as servomotors and servomotors in conjunction with a microprocessor as is common with CNC machines.

Figure 2:
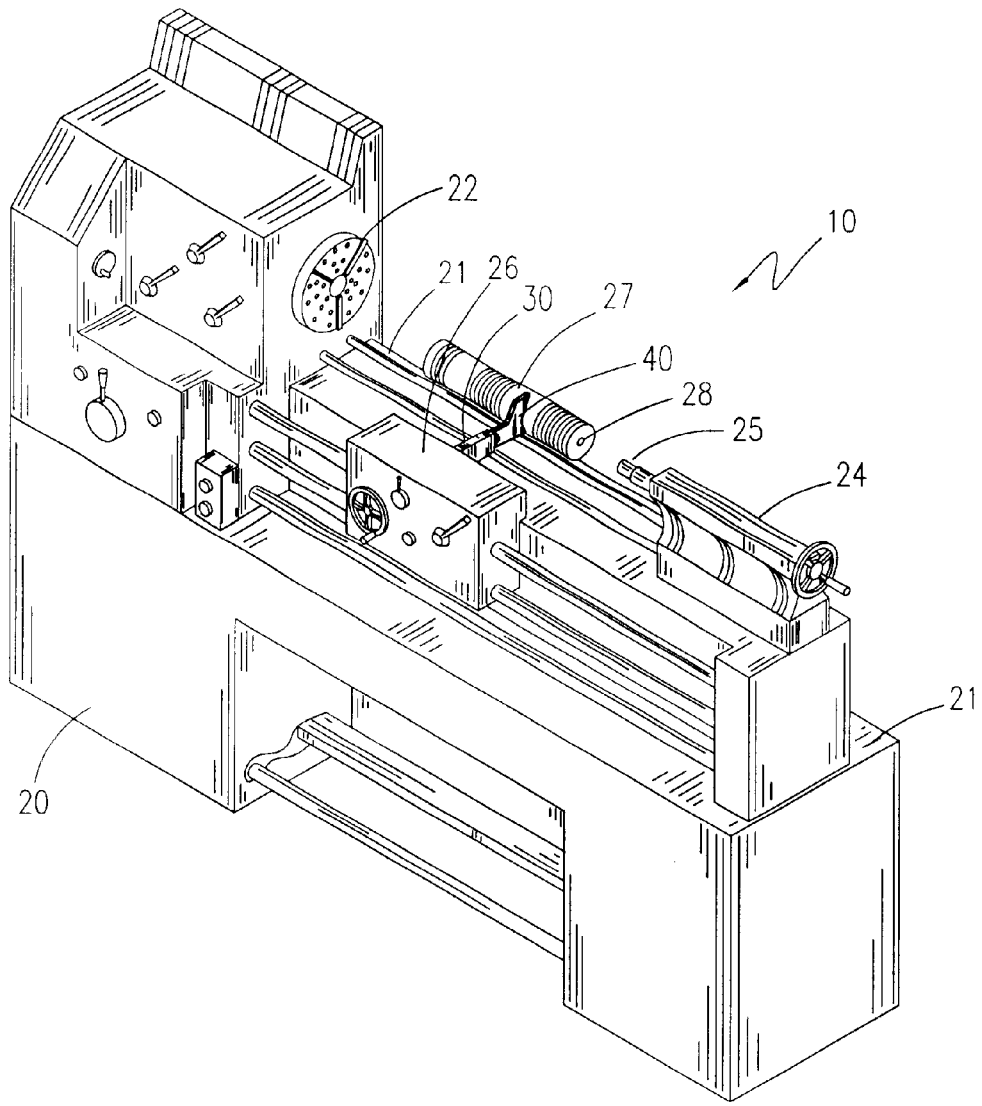
FIG. 2 is a perspective view of a conventional metal working lathe with a gage for determining the true centerline of a workpiece installed in the tool holder, according to the preferred embodiment of the present invention.

Referring to FIG. 2, shown is a conventional lathe 10 with the metal stock 27 turned to a diameter installed between the chuck 22 and tail stock center 24. The gage 40 is inserted into the tool holder pocket 32 of tool holder 30 (shown in further detail below.) The gage 40 is then moved via handwheels on carriage 26 or slid by hand so that either the upwardly sloping surface 44 or downwardly sloping surface 45 of its branched, angular end touches the external circumferential surface of the metal stock 27.

Figure 3:
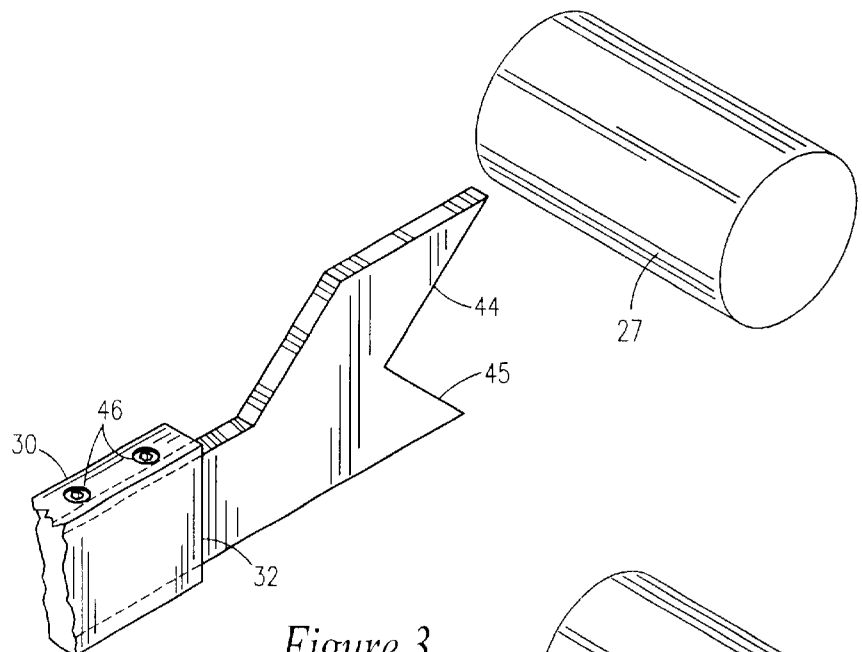
FIG. 3 is a partial cutaway perspective view of a gage for determining the true centerline of a workpiece installed in a tool holder of a conventional lathe, according to the preferred embodiment of the present invention.
Figure 4:
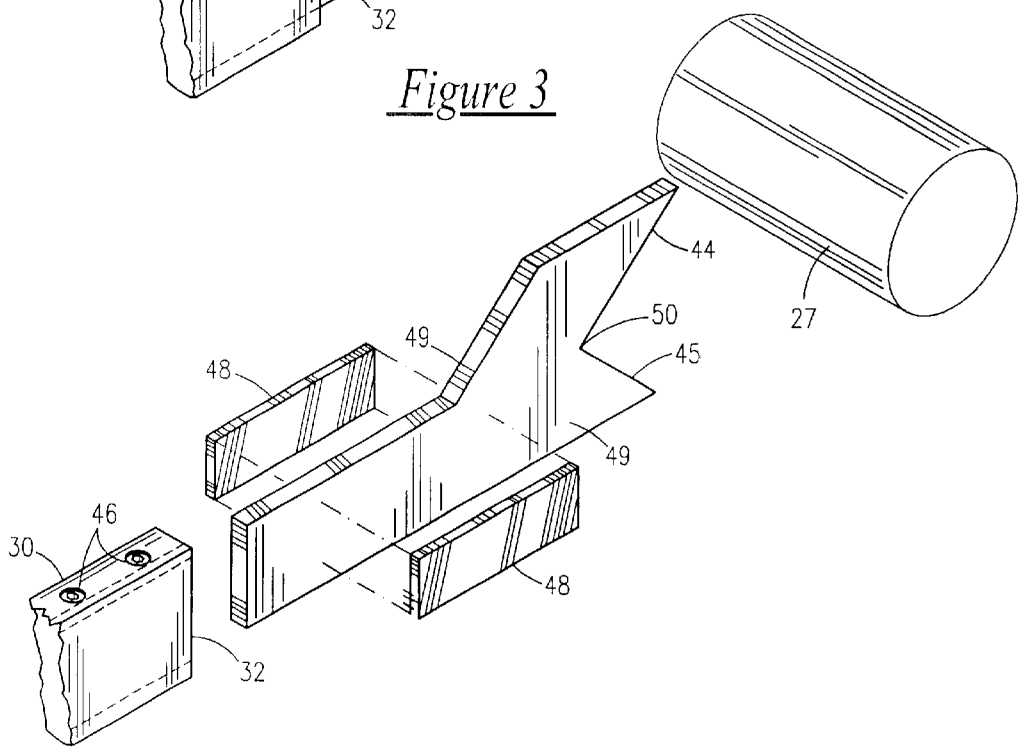
FIG. 4 is a partial cutaway exploded perspective view of a gage for determining the true centerline of a workpiece installed in a tool holder of a conventional lathe showing the detail of the magnets which temporarily hold the gage in the tool holder, according to the preferred embodiment of the present invention.

Referring now to FIG. 3, shown is a perspective partial cutaway view of gage 40 inserted in tool holder pocket 32 of tool holder 30. Typically, the end opposite the branched end of the gage 40 is slidably inserted into the tool holder pocket 32 and secured therein via a clamping means such as set screws 46. However, set screws 46 are not used to secure the gage 40 in tool holder 30 during the set up and alignment process. Referring to FIG. 4, instead, magnets 48 located on lateral sidewalls 49 of the gage 40 temporarily hold the gage 40 in place while the operator determines whether centerline 50 of gage 40 is in alignment with a longitudinal centerline of the metal stock 27. This procedure is described hereinbelow.

Figure 5:
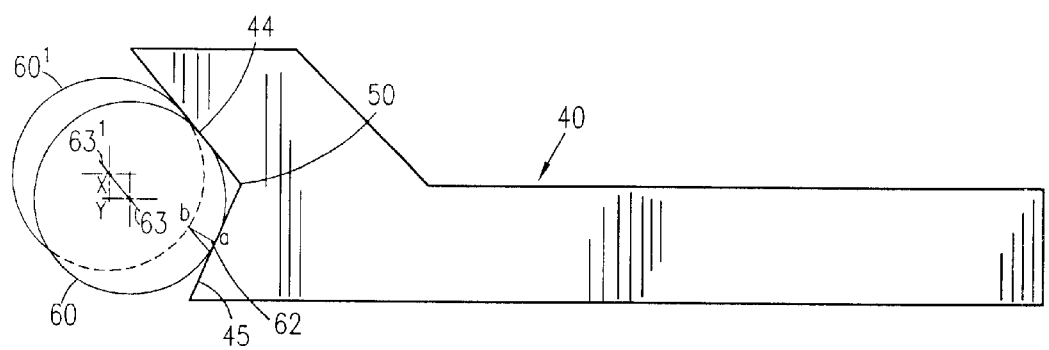
FIG. 5 is a front view of a gage for determining the true centerline of a workpiece showing the detail of the geometry of the upwardly sloping edge of the upwardly protruding arm and the downwardly sloping front edge of the gage in relation to a cross sectional view of a workpiece or test bar, according to the preferred embodiment of the present invention.

Referring now to FIG. 5, shown is a side elevational view of gage 40 adjacent to a pair of circles, 60 and 60', representing the cross section of the metal stock 27 while rotating when the gage 40 and the metal stock 27 are presented as heretofore described. Circle 60 represents the geometric relationship that the turned external circumferential surface of the metal stock 27 has with gage 40 when the centerline 50 of gage 40 is perfectly aligned with the metal stock 27. This is the situation, but in reality never exists because of human manufacturing tolerances. In a perfect situation, both the plus 30° and minus 30° points on the circumference of circle 60 will be in contact with and be points of tangency for both the upwardly sloping surface 44 and downwardly sloping surface 45 of the branched end of gage 40. The upwardly sloping surface 44 and the downwardly sloping surface 45 are located on opposed ends of gage 20 and separated by an angle of exactly 120°. The importance of this angle will be discussed further below.

Only one point on the external circumferential circumference of the metal stock 27 actually touches either the upwardly sloping surface 44 or downwardly sloping surface 45, and the centerline 50 of gage 40 shows which portion of the external circumferential surface of metal stock 27 is off center. This situation is represented by circle 60' and shows a "behind" center condition. This mandates then that a gap 62 exist between either the upwardly or downwardly sloping surface 44, 45 of gage 40 and a portion of the external circumferential surface of the metal stock 27. A longitudinal centerline 63 of circle 60 and a longitudinal centerline 63' of 60' are shown in FIG. 5. The gap 62, as shown in FIG. 5, exists between the downwardly sloping surface 45 of gage 40 and a portion of the external circumferential surface of the metal stock 27. This gap 62 can be measured and that value used to adjust the vertical position of any tool in the tool holder pocket 32, since the gap 62 is exactly equal to the distance that the longitudinal centerline of the metal stock 27 varies from the centerline 50 of gage 40. These distances are represented by lines xy and ab. in FIG. 5. This is because of the geometric relationships that are established by the angle of 120° between the upwardly and downwardly sloping surfaces 44, 45 and the external circumferential surface of the metal stock 27 located adjacent thereto.

Figure 8:
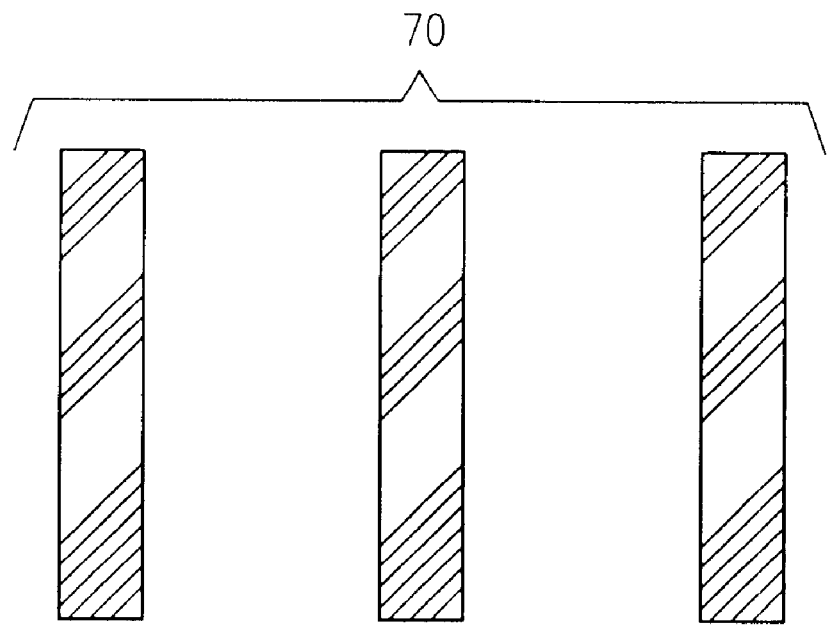
FIGS. 8 and 9 are a front and side view respectively, of an assortment of shims of varying thickness for insertion beneath a lathe tool to compensate for any deviation of the lathe tool with the centerline of the workpiece, according to the preferred embodiment of the present invention.
Figure 9:
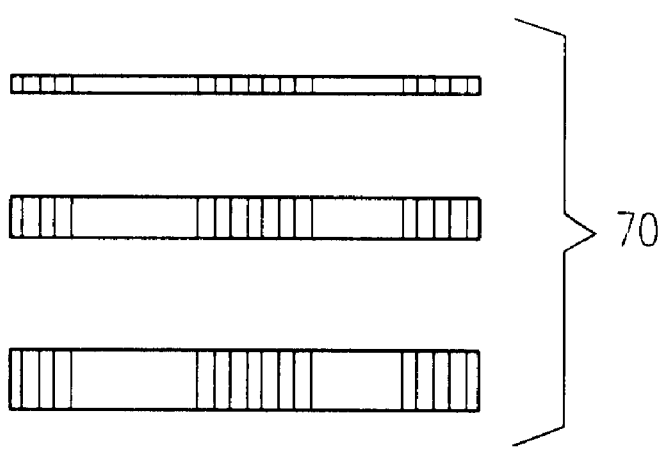

It is contemplated that a feeler gage typically used in automotive tune-ups would work well for measuring gaps in thousandths of an inch. The gage 40 can be adjusted vertically using shims 70 placed beneath it in tool holder 30. It is desired to actually use a shim 70 slightly thicker than this distance since it is better to have the centerline 50 of the gage 40 slightly above the longitudinal centerline of the metal stock 27 or other workpiece for the reasons heretofore discussed. These shims 70 are made of thin metal strips pre-cut to thicknesses corresponding to the range of thicknesses the feeler gage is capable of measuring. These shims 70 are shown in FIGS. 8 and 9. A generous quantity of these shims 70 would be supplied in the packaging of gage 40 as well as a feeler gage. Once the gage 40 is vertically adjusted, it can be secured in such position via the set screws 46.

Figure 6:
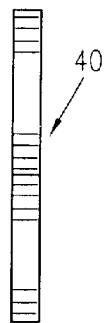
FIG. 6 is a front side view of a gage for determining the true centerline of a workpiece, according to the preferred embodiment of the present invention.
Figure 7:
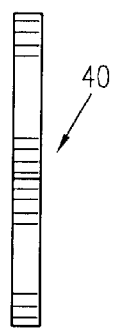
FIG. 7 is a rear side view of a gage for determining the true centerline of a workpiece, according to the preferred embodiment of the present invention.

The gage 40 can be made from virtually any material that is stiff and capable of being machined to close tolerances. The length and width of gage 40 is not critical to the invention except that gage 40 must fit into the tool holder pocket 32. The front face of the gage 40 is shown in FIG. 6 and an end view is shown in FIG. 7.

2. Operation of the Preferred Embodiment

In operation, the present invention is inserted into the tool holder 30 of the lathe 10 and held there by magnets 48 attached to its lateral sidewalls 49. A feeler gage is used to measure the gap 62, if any, between either the upwardly or downwardly sloping surface 44, 45 of gage 40 and a portion of the external circumferential surface of the metal stock 27. This distance can be measured by a conventional automotive type feeler gage. A shim 70 with slightly more than this thickness is used to adjust the gage 40 vertically in the tool holder 30 as it is desired to have the centerline 50 of the gage 40 slightly above the longitudinal centerline of the metal stock 27 or workpiece.

The foregoing description is included to illustrate the operation of the preferred embodiment and is not meant to limit the scope of the invention. The scope of the invention is to be limited only by the following claims.

What is claimed is:

1. A gage for determining the true dead center of a workpiece on a lathe or milling machine comprised of:
    a chuck, said chuck has one end of a metal stock inserted inside said chuck, wherein said metal stock is secured inside said chuck by a plurality of expanding and retracting radial arms of said chuck;
    a tail stock center, said tail stock center has a pointed end for being inserted into a small pilot hole drilled into a center of an opposite end of said metal stock;
    an adjustable tool carriage, said adjustable tool carriage is located on a bed of said lathe and provides a base for a tool holder, wherein said tool holder has a tool holder pocket formed inside said tool holder;
    a gage, said gage is of a linearly elongated configuration formed of two ends with one end removably inserted and secured within said tool holder pocket of said tool holder, said one end is opposite a branched, angular end with an upwardly sloping surface opposite a downwardly sloping surface, said gage is made from any material which is stiff and capable of being machined to close tolerances;
    a plurality of pre-cut shims, said shims being supplied in generous quantities with said gage; and
    a feeler gage, said feeler gage measures gaps in thousandths of an inch.

2. The gage for determining the true dead center of a workpiece on a lathe or milling machine of claim 1, wherein said upwardly sloping surface and said downwardly sloping surface of said gage is controllably pressed against an external circumferential surface of said metal stock by vertical adjustment of said adjustable tool carriage once machine is rotating, said upwardly sloping surface and the downwardly sloping surface of said gage are separated by an angle of exactly 120°.

3. The gage for determining the true dead center of a workpiece on a lathe or milling machine of claim 2, wherein said gage has magnets located on lateral sidewalls of said gage for temporarily holding said gage in place while operator determines whether centerline of said gage is in alignment with a longitudinal centerline of said metal stock.

4. The gage for determining the true dead center of a workpiece on a lathe or milling machine of claim 3, wherein said external circumferential circumference of said metal stock actually touches either the upwardly sloping surface or downwardly sloping surface, and said centerline of said gage shows which portion of said external circumferential surface of said metal stock is off center.

5. The gage for determining the true dead center of a workpiece on a lathe or milling machine of claim 4, wherein said external circumferential circumference of said metal stock touches either said upwardly sloping surface or said downwardly sloping surface of said gage which leaves a gap between either said upwardly sloping surface or said downwardly sloping surface of said gage and a portion of said external circumferential surface of said metal stock, said centerline of said gage shows which portion of said external circumferential surface of said metal stock is off center.

6. The gage for determining the true dead center of a workpiece on a lathe or milling machine of claim 5, wherein said gap is measured and that value is used to adjust a vertical position of said gage in said tool holder pocket, said gap is exactly equal to a distance a longitudinal centerline of said metal stock varies from said centerline of said gage.

7. The gage for determining the true dead center of a workpiece on a lathe or milling machine of claim 6, wherein said gap is measured with said feeler gage.

8. The gage for determining the true dead center of a workpiece on a lathe or milling machine of claim 7, wherein said gage is adjusted vertically using a shim placed beneath said gage in said tool holder pocket of said tool holder, said shim to be utilized would have a thickness slightly greater than a measured gap distance.

9. The gage for determining the true dead center of a workpiece on a lathe or milling machine of claim 1, wherein said plurality of shims are made of thin metal strips pre-cut to a thickness corresponding to a range of thicknesses said feeler gage is capable of measuring.

10. The gage for determining the true dead center of a workpiece on a lathe or milling machine of claim 8, wherein said gage is secured in position by set screws after said gage is vertically adjusted.

* * * * *